United States Patent [19]

Bauer

[11] Patent Number: 5,244,008
[45] Date of Patent: Sep. 14, 1993

[54] VALVE LOCKOUT ASSEMBLY

[75] Inventor: Dale A. Bauer, Fairfield, Ohio
[73] Assignee: Xomox Corporation, Cincinnati, Ohio
[21] Appl. No.: 972,608
[22] Filed: Nov. 6, 1982
[51] Int. Cl.[5] .................................... F16K 35/00
[52] U.S. Cl. ........................... 137/385; 251/93; 70/178; 70/180
[58] Field of Search .............. 137/385; 251/90, 92, 251/93; 70/175, 178, 180

[56] References Cited

U.S. PATENT DOCUMENTS

| 932,437 | 8/1909 | Brady | 137/385 |
|---|---|---|---|
| 983,842 | 2/1911 | Scheneible | 137/385 |
| 1,495,630 | 5/1924 | Bees | 137/385 |
| 3,865,130 | 2/1975 | Mullis | 137/385 |
| 5,058,622 | 10/1991 | Chitty, Jr. et al. | 137/385 |
| 5,139,041 | 8/1992 | Albrecht | 251/93 |

FOREIGN PATENT DOCUMENTS 883162 10/1971 Canada ........................ 137/385

*Primary Examiner*—A. Michael Chambers
*Attorney, Agent, or Firm*—Frost & Jacobs

[57] ABSTRACT

A valve lockout assembly for preventing mistaken operation of a valve includes an outer hub and an inner collar that are concentrically disposed about the actuating shaft of a valve. The outer hub engages the valve cover which prevents the hub's rotation. The inner collar, which is coupled to the actuating shaft, is also coupled to the hub at selected angular positions corresponding to fully opened and closed positions of the valve.

5 Claims, 4 Drawing Sheets

VALVE LOCKOUT ASSEMBLY

TECHNICAL FIELD

The present invention relates generally to rotatable valves and more particularly concerns a lockout assembly for preventing the unintentional opening or closing of a valve. The invention will be specifically disclosed in connection with an assembly for securing and locking the shaft of a rotatable valve in a predetermined angular position.

BACKGROUND OF THE INVENTION

In the petrochemical and other industries, valves are used on a wide scale basis to control the flow of process fluids. Due to the number of process valves in use at many modern industrial facilities, and the relatively large number of persons at those facilities that open and close one or more of the valves, or that may have the need or occasion to do so, it inevitable that workers will mistakenly open or closed a valve for a particular process line on occasion in the mistaken belief that they are opening or closing a valve for a different process line. Moreover, in many of these facilities, the process fluid controlled by a valve may be discharged at a location substantially downstream from the location at which the valve is located, and a mistaken valve operation is not always immediately apparent to the person operating the valve.

Since the inadvertent or mistaken opening or closing of a valve may result in personal or economic injury in some situations, it is frequently desirable, and sometimes mandatory, to lock a process line valve in a predetermined position. This predetermined position is usually either in a fully opened or fully closed position. The need to prevent mistaken or inadvertent valve operation is particularly acute when the process fluids controlled by the valve are hazardous. Indeed, when numerous hazardous process fluids are processed in large complex facilities, the locking of a valve in a predetermined position, e.g., a fully closed position, may be the most or only practical way of preventing a worker from mistakenly initiating flow of a hazardous process fluid in an untimely manner, and possibly causing injury to another worker downstream of the valve.

There have been numerous attempts to use lockout devices in the prior art to prevent the unintentional or mistaken opening or closing of a valve. For the most part, these lockout devices have successfully achieved the purpose of preventing the inadvertent or mistaken valve operation. However, the use of many of the prior art lockout designs have resulted in other problems. For example, one prior art valve lockout design for a plug valve use immovably secures a first stationary structural member with an outwardly extending stationary flange between the valve body and the valve cover. A second movable structural member then is rotatably attached to the valve shaft. Each of the first and second structural members is provided with an aperture that is alignable with the aperture of the other structural member when the shaft is rotated to a certain predetermined angular position, as for example to a closed position of the valve. A lock is then placed through the two aligned apertures preventing relative movement between the stationary and rotatable members, thus preventing rotation of the valve shaft relative to the stationary valve body. Installation of the above described first structural members, however, requires removal of the valve cover, and removal of the valve cover requires shutdown of any pressurized process line being controlled by the valve, and disturbance of the pressure boundary established by the valve cover.

Another prior art design that has achieved some success for use on plug valves includes a bracket that is mounted for common rotation with the valve shaft. The bracket has outwardly extending lugs that are positioned to engage upstanding bosses on a plug adjustment plate when the shaft is moved to a predetermined position. The engagement between the lugs and the bosses limit additional movement of the shaft, and the valve is thus prevented from moving to a prohibited position. However, the adjustment plate is used for thrust bolts, which thrust bolts are, in turn, used to adjust the pressure on the diaphragm in the valve. Hence, while such a design generally works satisfactorily, it suffers from the limitation that excessive torque applied to the valve shaft tends to move the thrust bolts. Movement of the thrust bolts, of course, is disadvantageous in that such movement may adversely affect the integrity of the diaphragm seal located at the top of the plug member.

SUMMARY OF THE INVENTION

Accordingly, it is an object of the invention to provide a valve lockout assembly that prevents movement of a rotatable valve to a predetermined position without disturbance of any pressure boundary of the valve.

It is another object of the invention to provide a valve lockout assembly that may be installed on a valve in a pressurized process line without disassembly of the valve cover and without shutdown of the process line.

It is a further object of the invention to provide a valve lockout assembly that may be easily installed and retrofitted.

It is yet another object of the invention to provide a valve lockout assembly capable of locking a valve in multiple predetermined positions.

It is still another object of the invention to provide a valve lockout assembly that permits the application of insulation against the valve line without binding of any rotating part.

It is yet another object of the present to provide a valve lockout assembly that will function for either quarter turn or 180 degree turn valves.

Additional objects, advantages and other novel features of the invention will be set forth in part in the description that follows and in part will become apparent to those skilled in the art upon examination of the invention. The objects and advantages of the invention may be realized and obtained by means of the instrumentalities and combinations particularly pointed out in the appended claims.

To achieve the foregoing and other objects and in accordance with the purposes of the present invention as described above, a valve lockout assembly is provided in combination with a valve having a valve body, a valve closure member rotatably movable relative to the body for selectively controlling fluid media through the valve body in accordance with its relative angular position with respect to the valve body, a valve cover, means for releasably connecting the valve cover to the valve body, and a valve shaft operatively connected to the closure member for rotating the closure member and controlling fluid flow through the valve body. The lockout assembly includes a tubular hub member that is concentrically disposed about the valve shaft and engagable with the valve cover so as to prevent relative rotation between the hub member and the valve cover independently of the means for releasably securing the valve cover to the valve body. The assembly further includes a tubular collar member concentrically disposed with respect to both the shaft and the hub member and positioned intermediate thereof. The collar member is at least partially fitted within the hub member and coupled to the shaft for common rotation therewith. Means also are provided for selectively coupling the collar member to the hub member at a selected angular position of the collar member so as to prevent relative rotation therebetween. Coupling of the collar and hub members in this manner prevents movement the valve closure member.

In accordance with another aspect of the invention, the lockout assembly includes at least one arm extending radially outwardly from the hub member and at least one boss extending upwardly from the valve cover. The arm engages the boss to prevent relative rotation between the hub member and the valve cover.

According to another specific aspect, the coupling means of the lockout assembly includes a flange having at least one aperture extending radially outwardly from the hub member, and a tab having at least one aperture extending radially outwardly from the collar member. The apertures of the flange and tab are aligned for coupling the hub and collar members whenever the collar member is at the selected angular position.

In accordance with another aspect of the invention, the coupling means is capable of coupling the collar member to the hub member at multiple selected angular positions of the collar member relative to the hub member.

In a still further and specific aspect of the invention, the hub member includes a plurality of radially extending arms and a plurality of bosses extend upwardly from the valve cover. These plurality of arms engage the plurality of bosses to prevent relative movement between the hub and collar members.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different embodiments and its several details are capable of modification in various obvious aspects all without departing from the invention. Accordingly, the drawing and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

Figure 1:
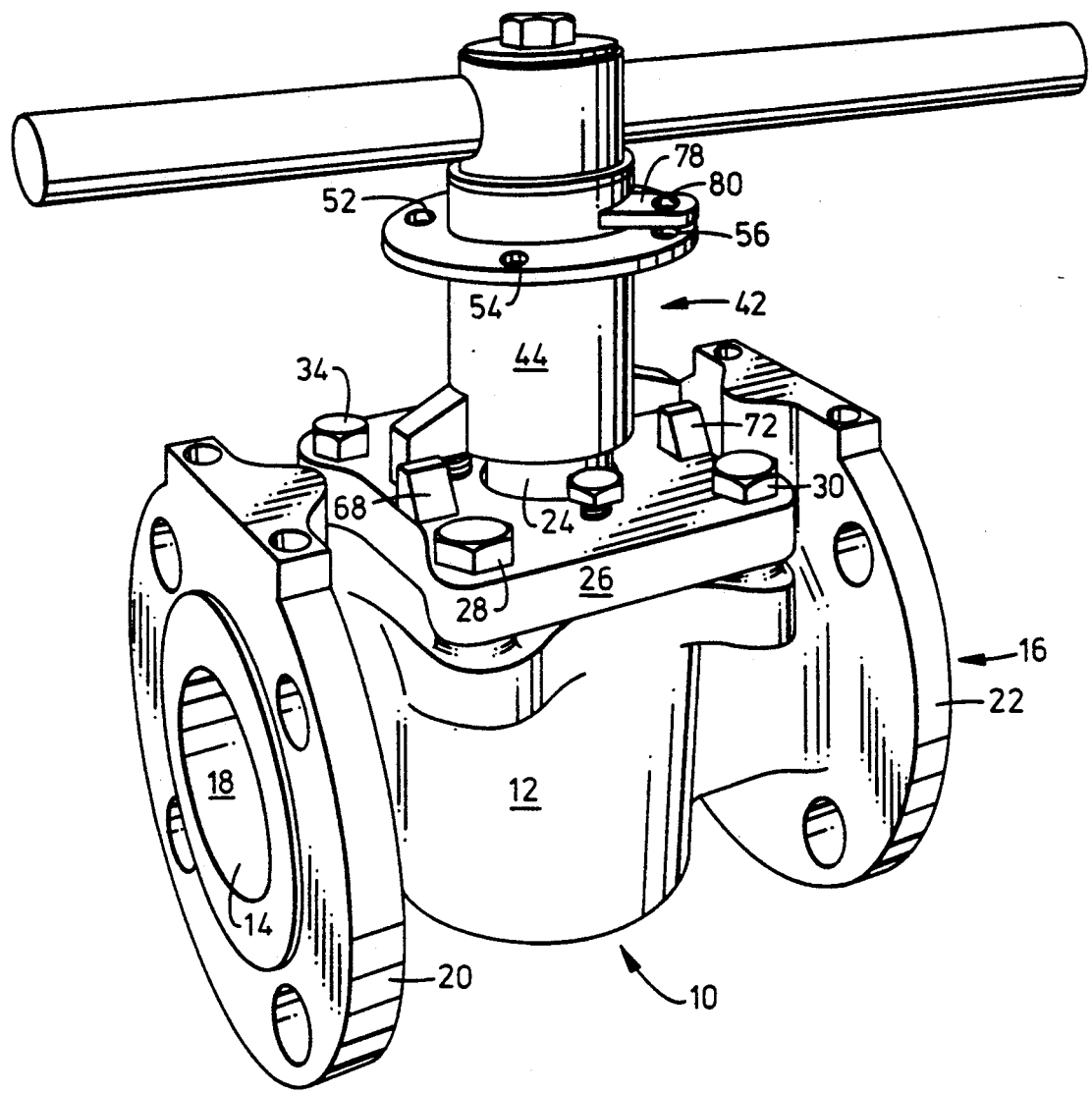
FIG. 1 is a perspective view of a plug valve utilizing a valve lockout assembly constructed in accordance with the principles of the present invention.

Referring now to the drawings, FIG. 1 illustrates a conventional plug valve provided with a lockout device constructed in accordance with the principles of the present invention. The plug valve, which is generally designated in the drawings by the numeral 10, includes a body 12, having an inlet 14 and an outlet 16 (now shown in FIG. 1, see FIG. 2). An internal flow passage 18 (which is only partially illustrated in FIG. 1, adjacent to the inlet 14) extends between the inlet 14 and outlet 16. The inlet 14 and outlet 16 are surrounded by respective aperatured flanges 20 and 22, by which the body 12 may be connected to complementary aperatured flanges (not shown) on fluid conduits for a process media.

As those skilled in the art will readily appreciate, the body 12 houses a rotatable valving member (not shown) which extends across the internal flow passage 18. The non-illustrated valving member has a through opening or passageway which is bought into and out of registry with the internal flow passage 18 by rotating the valving member. The flow of process media through the internal flow passage 18 is thus selectively controlled in accordance with the relative angular position of the valving member with respect to the body 12. More particularly, the valve 10 is moved to a closed position by rotating the through opening of the valving member out of registry with the internal flow passage, and is moved to an open position by rotating the same through opening of the valving member into registry with the internal flow passage. In the illustrated embodiment, the valve 10 is specifically disclosed as a tapered plug valve, which, it will be understood, utilizes a tapered plug as the valving member. Movement of the non-illustrated valving member is effectuated by a valve shaft 24, the outboard portion of which valve shaft 24 extends out of the body 12 through a valve cover 26. The valve shaft 24 functions to transmit a rotary driving force to the valving member.

Figure 2:
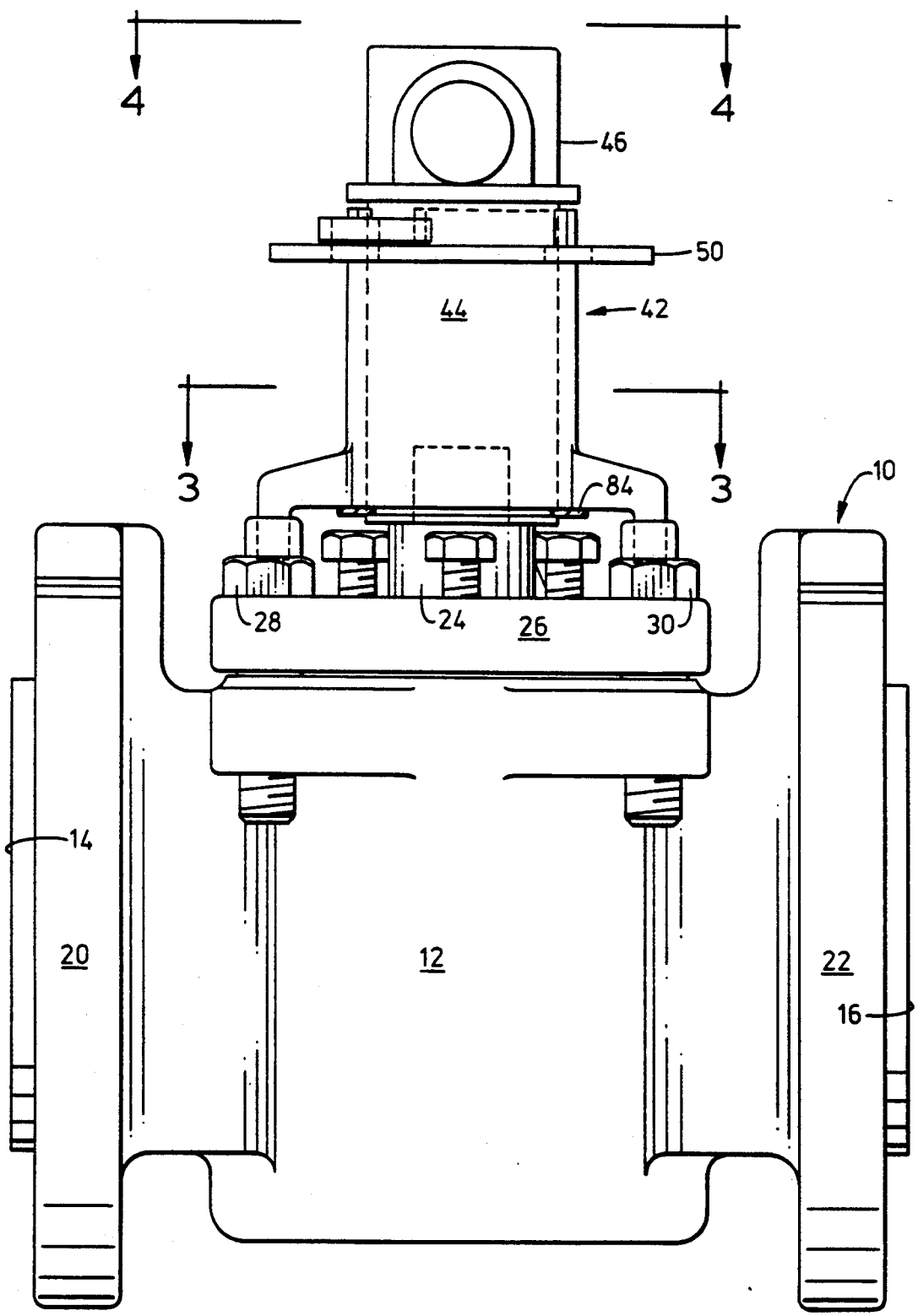
FIG. 2 is an elevational view of the plug valve and lockout assembly of FIG. 1.
Figure 3:
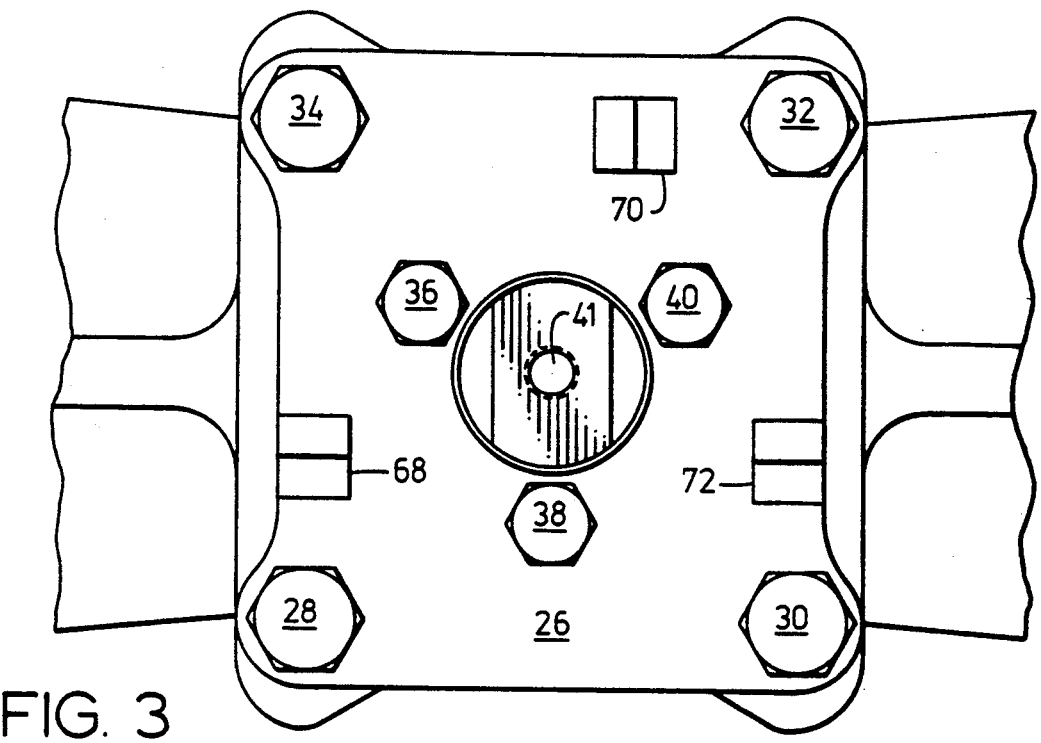
FIG. 3 is a plan view, taken in the direction of arrows 3—3 in FIG. 1 with the lockout apparatus removed.

From viewing FIGS. 1–4, it may be observed that the valve cover 26 is tightly secured to the body 12 by four valve cover bolts 28, 30, 32 and 34. Also seen in FIGS. 1–3 are three adjusting screws 36, 38 and 40, which adjusting screws 36, 38 and 40 also extend through the valve cover 26. As best seen from FIG. 3, these adjusting screws 36, 38 and 40 are located in equally spaced angular positions about the rotational axis 41 of the valve shaft 24. As those skilled in the art will appreciate, the adjusting screws 36, 38 and 40 are used to adjustably apply pressure through a thrust collar (not shown) to diaphragm (also not shown) located on top of the non-illustrated valving member, as is conventional in the art.

Figure 5:
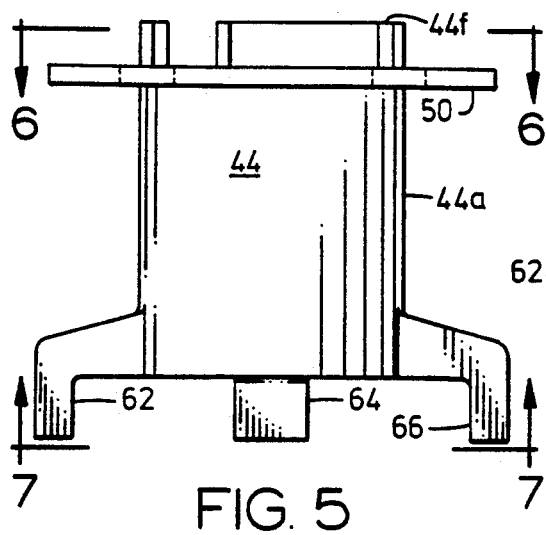
FIG. 5 is an elevational view of a first component of the lockout assembly of FIG. 1.
Figure 6:
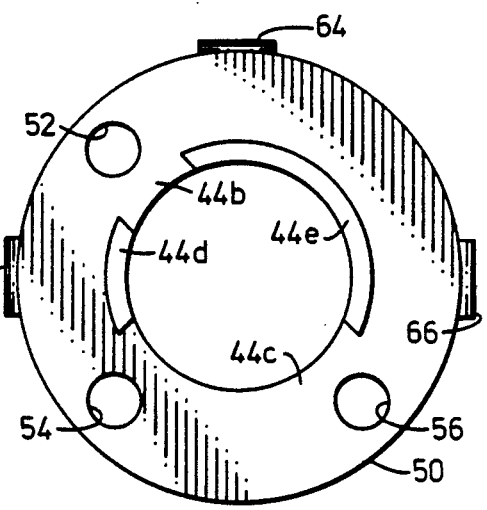
FIG. 6 is a plan view of the first lockout assembly component shown in FIG. 5.

In accordance with the principles of the invention, a valve lockout assembly, generally designed by the numeral 42, is positioned on the valve shaft 24, external to the valve cover 26. The lockout assembly 42, shown in FIGS. 1, 2 and 4, includes two cooperating members, an outer hub member 44 and an inner collar member 46. Referring now to FIG. 5, it can be seen that the outer hub member 44 has a central body portion 44a with a generally tubular configuration. As best seen from the plan view of FIG. 6, the uppermost section of the hub member 44 has two circumferential openings 44b and 44c disposed between circumferential wall sectors 44d and 44e. A flange 50 extends radially outwardly from an upper section of the body portion 44, and is located immediately below the circumferential openings 44b and 44c. As best seen in FIG. 6, the flange 50 has three apertures 52, 54 and 56, which apertures 52, 54 and 56 are equally spaced from the axis of the hub member 44.

Figure 7:
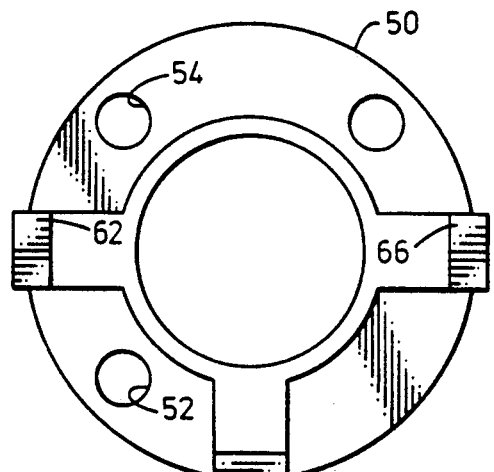
FIG. 7 is a bottom view of the lockout assembly component illustrated in FIGS. 5 and 6.

Three L-shaped arms 62, 64 and 66 extend radially outwardly and axially downwardly from the lower portion of the hub body portion 44. As will best appreciated from jointly viewing FIGS. 1, 3 and 7, the arms 62, 64 and 66 are angularly positioned about the periphery of the hub member 44 so as to respectively engage three upstanding bosses 68, 70 and 72 that extend upwardly from the valve cover 26. The engagement between the arms 62, 64, 66 and the bosses 68, 70 and 72 prevent relative rotation between the hub member 44 and the valve cover 26, which, in turn, prevents movement between the hub 42 and the valve body 12 to which the valve cover 26 is secured.

Figure 8:
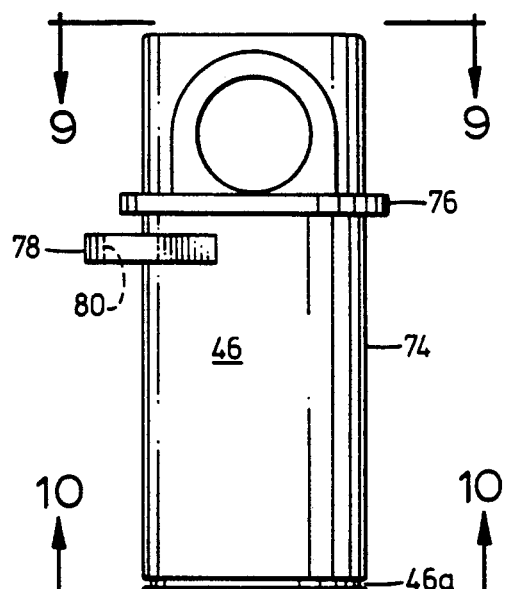
FIG. 8 is an elevational view of a second lockout assembly component.
Figure 9:
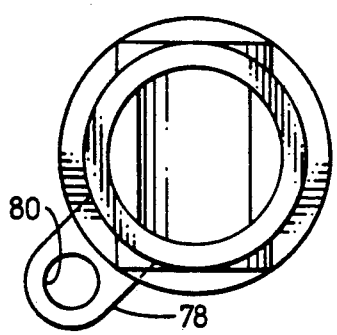
FIG. 9 is a plan view of the second lockout assembly component illustrated in FIG. 8.
Figure 10:
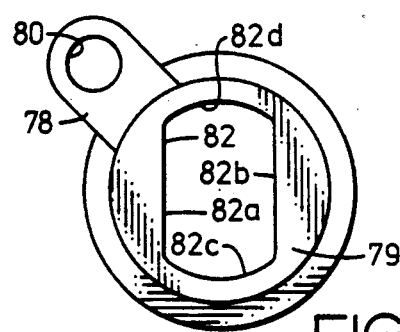
FIG. 10 is a bottom view of the second lockout assembly component illustrated in FIGS. 8 and 9.

Turning now to FIGS. 8-10, it is seen that the inner collar member 46 is also of generally tubular configuration. The collar member 46 includes a central body portion 74 with a flange 76 extending radially outwardly from its top portion. As shown in FIG. 8, the flange 76 divides approximately the top third of the collar member 46 from the lower two-thirds of that members. Also extending radially outwardly from the collar body is a tab 78, which tab 78 has an aperture 80. The aperture 80 is radially displaced from the axis of the collar member 46 by a distance equal to the radial displacement of the apertures 52, 54 and 56 form the axis of the hub 44. As best seen in FIG. 10, the collar member 46 also includes a bottom surface 79 having a aperture 82. The aperture 82 has a modified circular configuration that includes a pair of parallel flats 82a and 82b joined at their respective ends by arcuate sections 82c and 82d. As seen from FIG. 3, the shape of the aperture 82 matches the profile of the outboard portion of the valve shaft 24, which outboard portion extends through the valve cover 26 and is seen in FIG. 3.

Figure 11:
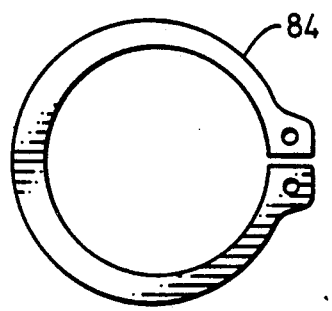
FIG. 11 is a plan view of a split ring retainer ring used for operatively joining the first and second lockout assembly components.
Figure 4:
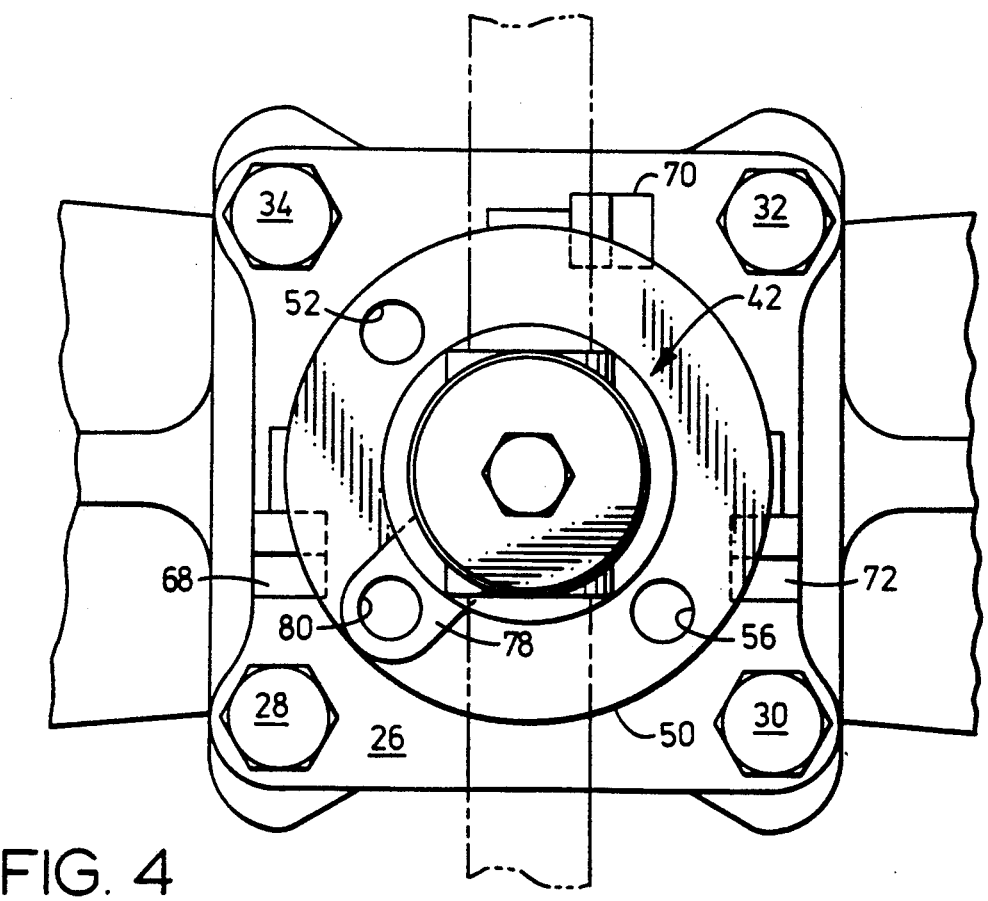
FIG. 4 is a plan view of the plug valve of FIG. 1 with the lockout assembly positioned on the valve shaft.

As is apparent from FIGS. 1, 2 and 4, the hub member 44 and the collar member 46 each are concentrically positioned about the shaft 24 with the collar 46 being disposed within the hub member 44 when the locket assembly is operated. In this operative position, the tab 78 extends radially outwardly through either of the circumferential openings 44b or 44c. When the collar member 46 and hub member 44 are so positioned, the collar flange 76 rotatably rests upon the upper surface 44f of the hub member 44 and extends outwardly above hub flange 50, as depicted in FIG. 5. The aperture 80 of tab 78 then may be rotated with the valving member to be aligned with either the hub flange apertures 54 or 56 (if the tab 78 extends through circumferential opening 44b) or hub flange aperture 52 (if the tab 78 extends through circumferential opening 44a). A split ring retainer 84, shown most clearly in FIG. 11, is insertable into a circumferential groove 46a on the lower portion of the collar member 44. Since the retaining ring 84 has an outer diameter greater than that of the diameter of hub member 44, as seen in FIG. 2, the retaining ring 84 functions to prevent upward axial movement of collar member 46 from the hub member 44.

It will be appreciated that the angular positions of apertures 52, 54, and 56 on hub flange 50 are selected so that the alignment of the tab aperture 80 with the hub flange apertures 54 and 56 will occur at the open and closed positions of a quarter valve, and that alignment of the tab aperture 80 with the hub flange apertures 52, 54 and 56 will occur at the three positions of a 180 degree valve. Circumferential wall sector 44d is removed from the hub member 44 to allow movement of the tab 78 throughout 180 degrees.

In summary, numerous benefits have been described which result from employing the concepts of the present invention. The lockout assembly is retrofitable in the field without disassembling the valve cover, and without distributing any pressure boundaries of the valve. The assembly is capable of locking either a quarter turn valve or a 180 degree valve in both fully open and closed positions. Moreover, since the hub member of the invention does not rotate, and the rotating collar member is largely covered by the hub ember, the assembly permits the application of insulation about the valve.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. In combination with a valve having a valve body, a valve closure member rotatably movable relative to the body for selectively controlling fluid media through the valve body in accordance with its relative angular position with respect to the valve body, a valve cover, means for releasably connecting the valve cover to the valve body, and a valve shaft operatively connected to the closure member for rotating the closure member and controlling fluid flow through the valve body, a lockout assembly, said lockout assembly comprising:

a) a tubular hub member concentrically disposed about the valve shaft, said hub member being engagable with the valve cover so as to prevent relative rotation between the hub member and the valve cover independently of the means for releasably securing the valve cover to the valve body;

b) a tubular collar member concentrically disposed with respect to both the shaft and the hub member and positioned intermediate thereof, said collar member being at least partially fitted within the hub member and coupled to the shaft for common rotation therewith; and c) means for selectively coupling the collar member to the hub member at a selected angular position of the collar member so as to prevent relative rotation therebetween, whereby the coupling of the collar and hub members prevents movement the valve closure member.

2. A lockout assembly as recited in claim 1 further including at least one arm extending radially outwardly from the hub member and at least one boss extending upwardly from the valve cover, and wherein the arm engages the boss to prevent relative rotation between the hub member and the valve cover.

3. A lockout assembly as recited in claim 1 wherein the coupling means includes a flange having at least one aperture extending radially outwardly from the hub member, and a tab having at least one aperture extending radially outwardly from the collar member, the apertures of the flange and tab being aligned for coupling the hub and collar members whenever the collar member is at the selected angular position.

4. A lockout assembly as recited in claim 1 wherein the coupling means is capable of coupling the collar member to the hub member at multiple selected angular positions of the collar member relative to the hub member.

5. A lockout assembly as recited in claim 2 wherein the hub member includes a plurality of radially extending arms and a plurality of bosses extend upwardly from the valve cover, the plurality of arms engaging the plurality of bosses to prevent relative rotation between the hub and collar members.

* * * * *

UNITED STATES PATENT AND TRADEMARK OFFICE
CERTIFICATE OF CORRECTION

PATENT NO. : 5,244,008
DATED : September 14, 1993
INVENTOR(S) : Dale A. Bauer

It is certified that error appears in the above-indentified patent and that said Letters Patent is hereby corrected as shown below:

On the cover page, item [22], "Nov. 6, 1982" should read --Nov. 6, 1992--

Column 8, line 13, (claim 5), "extend" should read --extending--.

Signed and Sealed this

Twenty-sixth Day of July, 1994

*Attest:*

BRUCE LEHMAN

*Attesting Officer*   *Commissioner of Patents and Trademarks*